Figure 1:
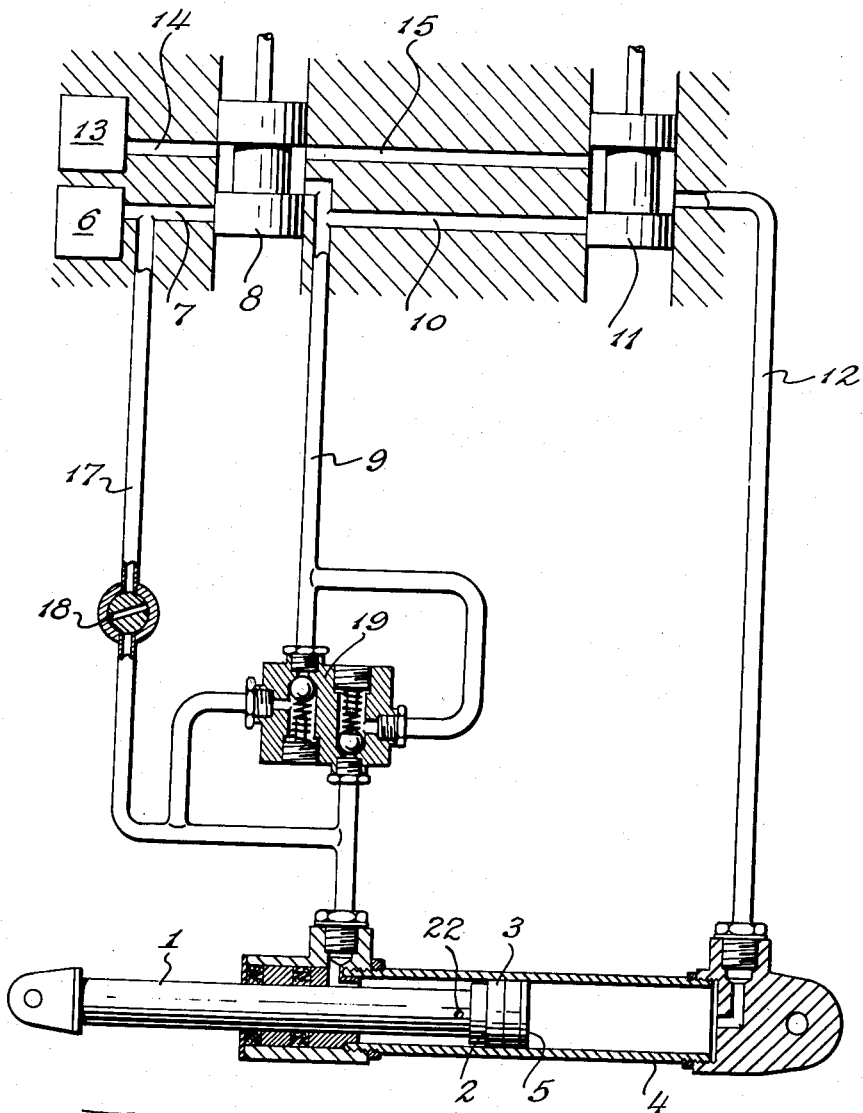

INVENTORS
ARTHUR P. GLENNY
DENNIS L. SPENCER
BY
Herbert H. Thompson
ATTORNEY

United States Patent Office 2,742,878
Patented Apr. 24, 1956

2,742,878

FLUSHING DEVICE FOR HYDRAULIC SERVOMOTORS

Arthur Philip Glenny, Hanworth, and Dennis Lincoln Spencer, West Twyford, London, England, assignors, by mesne assignments, to The Sperry Gyroscope Company, Limited, Brentford, England, a British company Application September 9, 1952, Serial No. 308,656

Claims priority, application Great Britain September 11, 1951

6 Claims. (Cl. 121—38)

This invention relates to hydraulic servo-motors and more particularly, but not exclusively, to two-to-one hydraulic servo-motors for use with automatic aircraft pilots. A two-to-one servo-motor is defined in this specification as a motor consisting of a piston which is movable within a cylinder and which has opposite faces of different areas, the smaller face being, when the servo-motor is in use as such, continually subjected to high-pressure hydraulic fluid and the other face being subjected to a smaller high fluid pressure, which smaller pressure can be varied to cause the net force on the piston to act in either direction whereby movement of the piston in the cylinder can be controlled by varying the smaller pressure. The piston may be coupled to a control surface of an aircraft, and the liquid in the system be controlled in response to signals to provide a difference between the forces on the piston faces which will move the piston and hence the control surface in a desired manner. Thus, the aircraft may be controlled in accordance with the signals.

Automatic pilots are provided with means whereby the craft may be controlled manually, and after a period of manual operation, when it is desired to return to automatic control of the aircraft, the hydraulic servo motor will again be connected to a pump which provides liquid under pressure. During periods of manual operation air pockets often appear in the system and particularly in the cylinder. Air pockets in the system are a considerable disadvantage because when automatic control is resumed and the system is once more connected to the pump, the air will be compressed to the pressure of the liquid. Compression of the air takes some time and causes a lag which is present in all operations of the system involving a change in liquid pressure, and also because the movement of the piston to compress the air when automatic control is first engaged moves the control surface from its stable position and causes the craft to give a violent kick.

It is an object of the invention to provide means for removing gas, and particularly air, from a hydraulic servo-motor system, and accordingly a hydraulic system includes a servo-motor consisting of a piston movable in a cylinder in accordance with the relation between the liquid forces on two opposite faces, characterized by means for flushing the system prior to commencement of operation thereof by supplying liquid to flow through the system to exhaust and to carry with it gas which may be present in the system.

The flushing liquid is preferably supplied from the same source (e. g. a pump) that supplies the operating liquid and a restrictor included between the source of liquid and the hydraulic system reduces the pressure of the flushing liquid to below the normal liquid pressure in the system.

According to another aspect of the invention a two-to-one servo-motor is characterized by a normally-open valve in a channel connecting the two faces of the piston, which valve is arranged to be closed when, as is the case when the motor is in use as such, there is a large pressure difference between the pressures acting on the faces of the piston, by way of which valve, when it is open, low pressure flow can flow through the cylinder to sweep out any gas that is in the cylinder.

Normally the small end of the cylinder will be continually supplied with high-pressure fluid and the piston will be in equilibrium in the cylinder if the fluid pressure on the large face bears the same relation to the pressure on the small face that the small area bears to the large area. It is usual for the small face to be approximately half the size of the large face so that the piston will be equilibrium where the pressure in the large end of the cylinder is about half the pressure in the small end of the cylinder. The valve is arranged to be closed when the pressure in the small end of the cylinder is substantially greater than the pressure in the large end.

When, after a period of non-use, it is desired to resume operation of the servo-motor, before the high-pressure fluid is supplied to the cylinder, low-pressure fluid is pumped through the cylinder to exhaust by way of the normally-open valve which will be open in the absence of high-pressure fluid in the cylinder. Any gas which has collected in the motor during the period of non-use will be swept out by the flow of low-pressure fluid so that when the high-pressure fluid is again supplied to the motor there will be no gas pockets present.

In this specification "low-pressure fluid" is defined as fluid at a pressure which is less than the pressure difference necessary between the faces of the piston to cause the valve to close, and a "large pressure difference" is defined as a pressure difference sufficient to close the valve.

Figure 2:
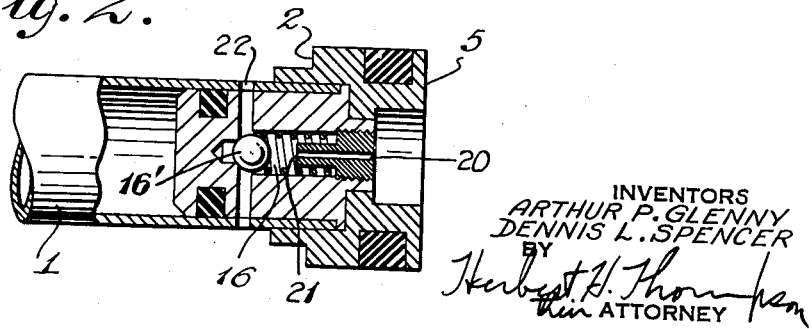

The invention will be more clearly understood from the following description of a specific example of a hydraulic servo-motor system according to the invention for controlling movement of a control surface of an aircraft in accordance with control signals. The system is shown diagrammatically in Figures 1 and 2.

The control surface is coupled to a shaft 1 fixed at one end to one face 2 of a piston 3 which is movable within a cylinder 4. The shaft 1 has a cross-sectional area equal to about half the area of the cylinder so that the piston 3 will be stationary when the pressure on the shaft face 2 of it, that is, the pressure in the small end of the cylinder 4 is about twice the pressure on the other face 5, that is, in the big end of the cylinder 4. Liquid is supplied to the cylinder 4 from a pump 6 at a pressure of 1,000 pounds per square inch. The liquid is supplied by way of channel 7, cut-off valve 8, and channel 9, to the small end of the cylinder directly and to the big end of the cylinder by way of channel 7, cut-off valve 8, channel 10, control valve 11 and channel 12. The control valve 11 is adjusted in accordance with control signals to cause a varying drop in pressure in the liquid in passing through it. Thus, the pressure of the liquid in the small end of the cylinder 4 will be constant at 1,000 pounds per square inch and the pressure in the big end will be something less than this value according to the adjustment of the control valve 11. In the balanced position when the piston 3 is stationary the pressure in the big end will be about 500 pounds per square inch and hence the drop in pressure in the control valve will be 1000 less 500, i. e. 500 pounds per square inch.

If it is desired to move the control surface of the aircraft, because for example, a control signal is received from a pick-off device associated with a control gyroscope, the control signal will be applied to the control valve 11 which will be adjusted to change the drop in pressure in liquid passing through it so that the pressure in the big end of the cylinder 4 will change and the piston 3 will be moved in one direction or the other so as to adjust the control surface of the aircraft. The control surface will move until the piston 3 is again made stationary by a change of the liquid pressure in the big end of the cylinder 4. When a stable position is reached the pressure in the big end will be again 500 pounds per square inch.

If it is required to control the aircraft manually the cut-off valve 8 will be closed so that liquid will no longer be supplied to the cylinder 4 and both ends will be opened to exhaust 13 by way of channel 14 or channels 14 and 15 so that the piston 3 may be moved easily in response to manual control. This is the position of valve 8 shown in Fig. 1.

On returning to automatic operation it may be that air will have collected in the system and particularly in the cylinder 4. When the cut-off valve 8 is opened, liquid will flow directly into the small end of the cylinder at 1,000 pounds per square inch pressure and by way of the control valve 11 to the big end of the cylinder 4. Before the forces on the two faces of the piston 3 will be equal, the air in the system must be compressed to the liquid pressure and during this time the piston 3 will move in response to the unbalance in the forces on its faces. Thus the control surface will be moved away from its stable position causing the aircraft to give a violent kick. Whenever control of the surface is required, the necessary change in pressure in the big end of the cylinder 4 has to be transmitted to the piston 3 through the medium of the air pockets and the time taken for the air to expand or to be compressed produces an undesirable lag in the control.

In order that air may be removed from the system before returning to automatic operation according to the invention there is provided a valve 16 connecting the two faces of the piston 3 through axially extending restricted passage 20 provided with valve seat 21 and a radial bore 22. This valve is shown more clearly in the enlarged detail view of Figure 2. The valve 16, shown in the form of a ball 16′, is biased by spring 23 in the open position to allow the passage of liquid between the two ends of the cylinder 4 when the system is not under automatic control, but during the working stroke it is seated upon the valve seat 21 to prevent liquid flow between the two ends of the cylinder. In other words, when the pressure in the small end of the cylinder is substantially greater than the pressure in the large end as is the case in normal operation, the difference in pressures is sufficient to hold the valve 16 closed so that liquid cannot pass from one side of the piston 3 to the other. For example, the valve may be designed to be kept closed where there is a pressure difference between the faces of the piston 3 of greater than 80 pounds per square inch. The pump for supplying the liquid is connected to the small end of the cylinder by way of a channel 17 including a restrictor valve 18 to reduce its pressure to 20 lbs. per square inch. Thus, even though the cut-off valve 8 is closed, as soon as the pump 6 is started, liquid flows at a pressure, reduced by reason of the restrictor 18, into the small end of the cylinder 4 and through the valve 16 in the piston to the big end of the cylinder and thence to exhaust 13 by way of the control valve 11. Thus the difference in the pressures on the two sides of the piston 3 is reduced to a small value and the spring is accordingly effective to open the valve 16. Accordingly the pump 6 pumps liquid at the considerably reduced pressure through the system and this liquid flushes the system by sweeping any air that has leaked in away with it to exhaust so that when the cut-off valve 8 is opened and the system is again charged with liquid no air is present.

In order that the flushing liquid does not flow directly to exhaust 13 by way of the cut-off valve 8 without flowing through the cylinder 4, the channel 9 from the cut-off valve 8 to the cylinder 4 is supplied with a two-way non-return valve 19, that is, a valve which will allow liquid to pass in either direction only if its pressure exceeds a certain pressure greater than the pressure of the flushing liquid but less than the normal pressure of the liquid under operating conditions (say 50 pounds per square inch).

When the cut-off valve 8 is again opened the high-pressure liquid will close the valve 16 and the system will be ready for automatic operation as before.

It will be seen that the invention provides a simple method of removing air or other gas from the hydraulic system which comes into action automatically regardless of the positions of the various valves in the system. The flushing liquid can be allowed to flow continually during automatic control of the aircraft.

Although the invention has been described with relation to an automatic pilot for an aircraft, it will be clear that it is not limited to such applications, but is applicable to any kind of hydraulic servo system in which automatic control is required intermittently.

We claim:
1. A two-to-one hydraulic servo-motor system including a cylinder and piston having a large and a small effective face, means for supplying high pressure fluid to the small face, means for supply a variable intermediate pressure to the large face, a bypass valve in the piston biased in the open position, but adapted to be closed and remain closed only when subject to high pressure acting on the small face of the piston, whereby when working pressure is discontinued, low pressure fluid can flow through the cylinder to sweep out any gas that is in the cylinder, and means for supplying low pressure fluid to the cylinder for such purpose.

2. A two-to-one hydraulic servo-motor system including a cylinder and piston having a large and a small effective face, means for supplying high pressure fluid to the small face, means for supplying a variable intermediate pressure to the large face, a bypass valve in the piston biased in the open position, but adapted to be closed and remain closed when subject to high pressure acting on the small face of the piston, whereby when it is opened, low pressure fluid can flow through the cylinder to sweep out any gas that is in the cylinder, and bypass means including a restrictor valve for supplying fluid at reduced pressure for flushing out the cylinder when not in normal operation.

3. A hydraulic servo system as claimed in claim 2 having selective valves for preventing bypassing of the cylinder and piston by either the fluid when under high working pressures or the fluid under the reduced flushing pressure.

4. A hydraulic servo system consisting of a piston movable within a cylinder, means for supplying fluid to one end of the cylinder at constant high pressure during working periods, means for supplying fluid to the other end of the cylinder at a variable intermediate pressure during working periods, alternative means for supplying only the first end of the cylinder with a lower pressure, and a normally open bypass valve in the piston connecting the two ends of the cylinder, but which closes when subject to the working high pressure in the first end of the cylinder.

5. A servo-motor as claimed in claim 1 including a channel for supplying the low-pressure fluid to sweep the cylinder, and a channel for supplying high-pressure fluid to the cylinder characterised by a valve arranged so that fluid cannot flow between the said two channels unless it is at a pressure at least equal to the pressure difference necessary between the faces of the piston to cause the valve to close.

6. A servo-motor as claimed in claim 5 wherein the channel for supplying low-pressure liquid to the cylinder is connected to a source of high-pressure liquid and includes a restrictor for reducing the high-pressure liquid to low-pressure liquid.

References Cited in the file of this patent

UNITED STATES PATENTS

| | | |
|---|---|---|
| 1,700,394 | Young | Jan. 29, 1929 |
| 1,873,396 | Hallenbeck | Aug. 23, 1932 |
| 1,890,244 | Barrett | Dec. 6, 1932 |
| 2,179,179 | Fischel | Nov. 7, 1939 |
| 2,452,369 | Gravenhorst et al. | Oct. 26, 1948 |